United States Patent [19]

Doveri

[11] Patent Number: 4,773,573
[45] Date of Patent: Sep. 27, 1988

[54] DEVICE FOR SECURING A REMOVABLE COMPONENT PART TO THE FRAME OF A TWO-WHEELED MOTOR VEHICLE

[75] Inventor: Carlo Doveri, Pontedera, Italy
[73] Assignee: Piaggio & C. S.p.A., Genova, Italy
[21] Appl. No.: 404,908
[22] Filed: Aug. 3, 1982
[30] Foreign Application Priority Data

Aug. 7, 1981 [IT] Italy .................. 22604/81[U]

[51] Int. Cl.[4] ............................... B62J 7/00
[52] U.S. Cl. ..................... 224/32 A; 224/30 R; 224/39
[58] Field of Search ............. 224/30 R, 31, 32 R, 224/32 A, 39; 70/57, 158, 160, 184, 187, 233, 258, DIG. 67, 416, 209, 211, 256, 259; 292/346, DIG. 25, 113, 29; 280/289 A; 297/192, 193, 195

[56] References Cited

U.S. PATENT DOCUMENTS

| 1,197,612 | 9/1916 | Ditlevson | 292/DIG. 25 |
|---|---|---|---|
| 2,423,003 | 6/1947 | Buegeleisen | 224/32 R |
| 2,559,548 | 7/1951 | Seigneur | 292/99 X |
| 2,907,378 | 10/1959 | Barecki | 297/193 |
| 3,013,814 | 12/1961 | Becks | 224/32 R X |
| 3,779,597 | 12/1973 | Uchida | 224/31 X |
| 3,788,532 | 1/1974 | Bish | 224/31 |
| 3,795,354 | 3/1974 | Stippich | 224/32 R X |
| 3,927,727 | 12/1975 | Hanagan | 297/193 X |
| 4,073,170 | 2/1978 | Miyabayashi et al. | 70/256 |
| 4,171,731 | 10/1979 | Hilber | 224/31 X |
| 4,228,983 | 10/1980 | Bowman, Jr. | 70/161 X |
| 4,244,496 | 1/1981 | Litz | 224/39 X |
| 4,413,492 | 11/1983 | Strange | 70/256 X |

FOREIGN PATENT DOCUMENTS

| 2495092 | 6/1982 | France | 224/30 R |
|---|---|---|---|
| 446331 | 4/1936 | United Kingdom | 224/32 A |

*Primary Examiner*—Henry J. Recla
*Attorney, Agent, or Firm*—Cushman, Darby & Cushman

[57] ABSTRACT

For securing side boxes to the frame of a motor-scooter or similar vehicle, a hand operated mechanism is provided, which consists of a rod (14) having a handle-shaped end (19) and a crank-like bent portion (20) coooperating with an eccentrically mounted connecting rod (26) having a hooked end (23) adapted to seize a corresponding interlocking member (24) secured to the side box (12). The rod (14) is mounted generally vertically in the interior of the scooter's body (13) and the rod handle (19) is positioned in a space which can be closed by a lock and a key to prevent unauthorized manipulations.

7 Claims, 4 Drawing Sheets

DEVICE FOR SECURING A REMOVABLE COMPONENT PART TO THE FRAME OF A TWO-WHEELED MOTOR VEHICLE

This invention relates to a device which is generally adapted to secure a removable component part to the frame of a two-wheeled motor vehicle and, more particularly but not exclusively, adapted to secure a lateral box to the body of a two-wheeled motor vehicle.

In a few types of motor-scooters in use nowadays, each of the two removable lateral boxes, which complete the rear portion of the scooter's body, can be secured to such body by a spring-biassed hook which can be actuated from the outside.

This external hook is pivotally connected to the scooter's body in a low position, close to the bottom edge of the box, and is capable of being manually swung from a hooking-in position to a unhooking position, and vice versa, so as to enable the box to be removed from the body or to be secured thereto, respectively.

In spite of its simplicity of construction, this latching arrangement for the side boxes is, however, conducive to inconveniences.

As a matter of fact, the possibility afforded to anybody of unlatching the side boxes by merely manipulating the external hooks is not such, apparently, as to provide any measure of safety against attempts by unauthorized people to remove the boxes and their contents, such as spare parts of the scooter, spare wheel, accessories, personal objects and the like.

Furthermore, the low position of the outer hooks is such as to compel the driver to take inconvenient postures, or to kneel, that which ought to be avoided as far as practicable.

An object of the present invention is to provide a latching device capable of being so positioned as to enable, in general, any removable component part latched to a fixed section of a two-wheeled motor vehicle to be unlatched by the vehicle owner exclusively whenever desired and, in addition, capable of being simply and conveniently manipulated.

The basic principle of this invention is characterized in that a hook is provided, which is capable of being swung within a mounting formed in a fixed portion of the vehicle from a position in which it grasps the removable component part to a clearing position and vice versa, with a movement which guided by the abutment of said hook on the surface of said mounting, said hook being connected by a journal connection to a shaft which is inaccessibly supported by the interior of said fixed portion of the vehicle body, said shaft being swingable by a linkage to be manipulated within a specially provided space in the vehicle which can be latched by key-actuated latching means. In the case in which this invention is to be applied to the body of a motor-scooter having a swingable saddle which is swung out for giving access to the stopper of the fuel tank, the saddle being susceptible of being latched in its position of use by a key-actuated lock, and if it is desired to apply this invention to secure to the scooter's body a side box, the basic principle of the invention is embodied by a particular constructional arrangement in which the crank, the linkage and the manipulating handle are combined into a single rod. Said rod is mounted for being swung in a nearly vertical position in the interior of the scooter's body and has its bottom end shaped in a crank-like manner for being eccentrically coupled with the hook. The hook, in its turn, can be swung, as guided by a slot formed through the scooter's body, in correspondence with the lateral box, to seize the latter from the inside in a certain angular position of the rod, and to release the box in other angular positions, the top end of the rod being shaped as a handle emerging from the scooter's body in the space underneath the saddle, said space being accessible only when using the specially provided key for actuating the lock.

In order that the features and the advantages of the present invention may better be appreciated, an exemplary embodiment will be described hereinafter, to be illustrated in the accompanying drawings, wherein.

Figure 1:
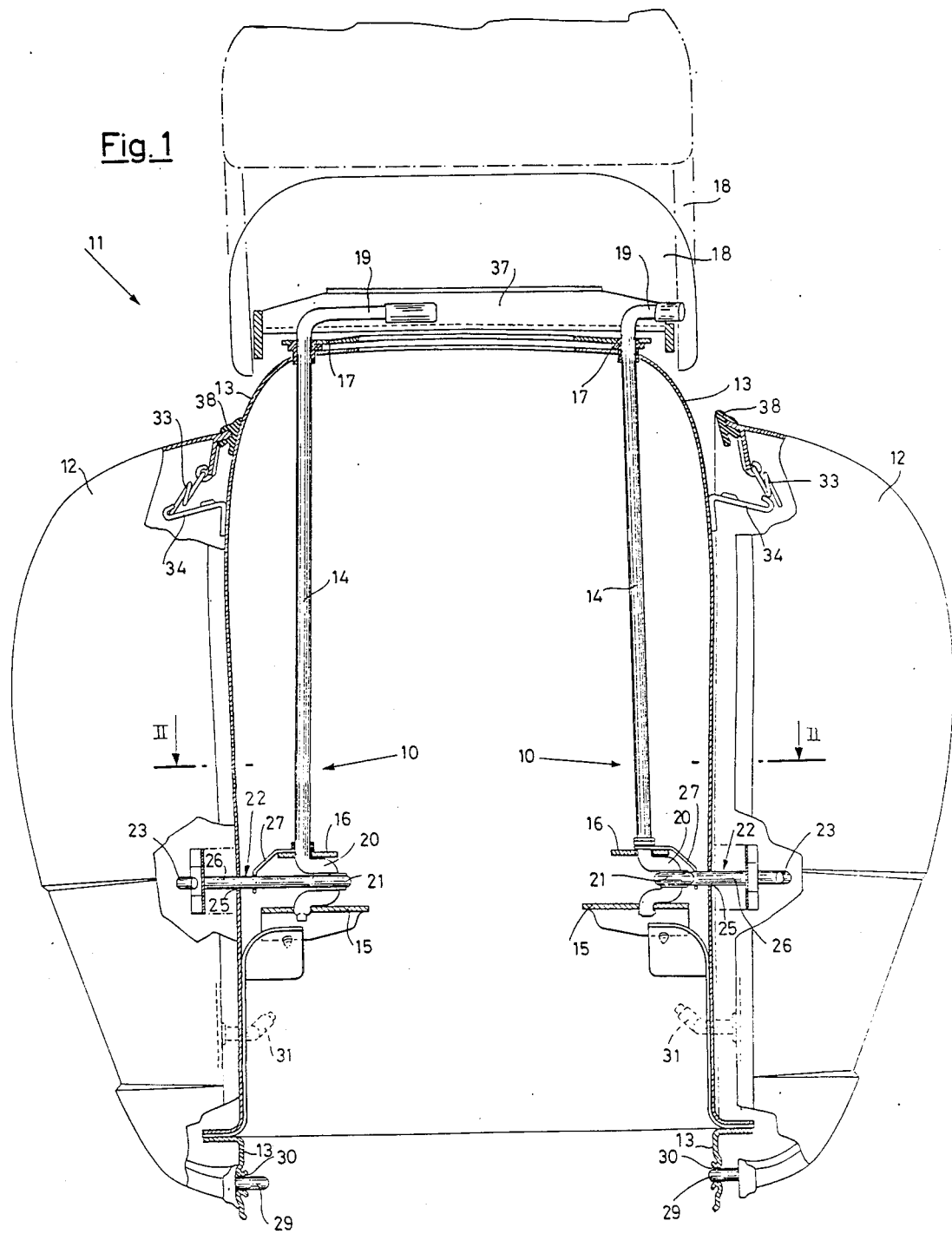
FIG. 1 is a cross-sectional view, taken along the line I—I of Fig. 2, of two latching arrangements according to the invention, as applied to a motor-scooter.

In the Figures of the accompanying drawings, two latching devices, 10, are shown, installed, according to the invention, on a motor-scooter, 11, of conventional make having a saddle 18 which can be swung about a pin 38 and can be latched in its horizontal position of use by a lock 35 actuatable by a key. The motor scooter 11 is shown only in its rear portion.

Each latching device such as 10 is adapted to secure either side box 12 of the scooter 11 to the body 13 thereof.

Each latching device 10 is composed of a rod 14, which is mounted in a nearly vertical position in the interior of the scooter's body 13 for being swung on bearings 15,16,17 integrally fastened to same body 13. Either end of the rod 14 emerges out of the body 13 beneath the saddle 18 of the motor scooter 11, the projecting portion of the rod 14 being bent to provide a handle 19 for said rod. At the opposite end, the rod 14 is doubly bent to form a crank 20, which is eccentrically connected for rotation about the longitudinal center line of the rod 14 to an end journal 21 of a hook 22, the latter being arranged on a plane perpendicular to the axis of the rod 14. At the the opposite end, the hook 22 is bent just in the shape of a hook along a portion 23 thereof which adapted to seize a bracket 24 fastened to the front portion of the box 12 and projecting inwardly relative to said box. In order to be able to seize the bracket 24 by its hooked portion 23, the hook 22 must be passed through the body 13: this is allowed by a slot 25, formed through the body 13 and through which the shank 26 of the hook 22 can be passed, so that a restricted swinging arc is provided for the hook.

Figure 2:
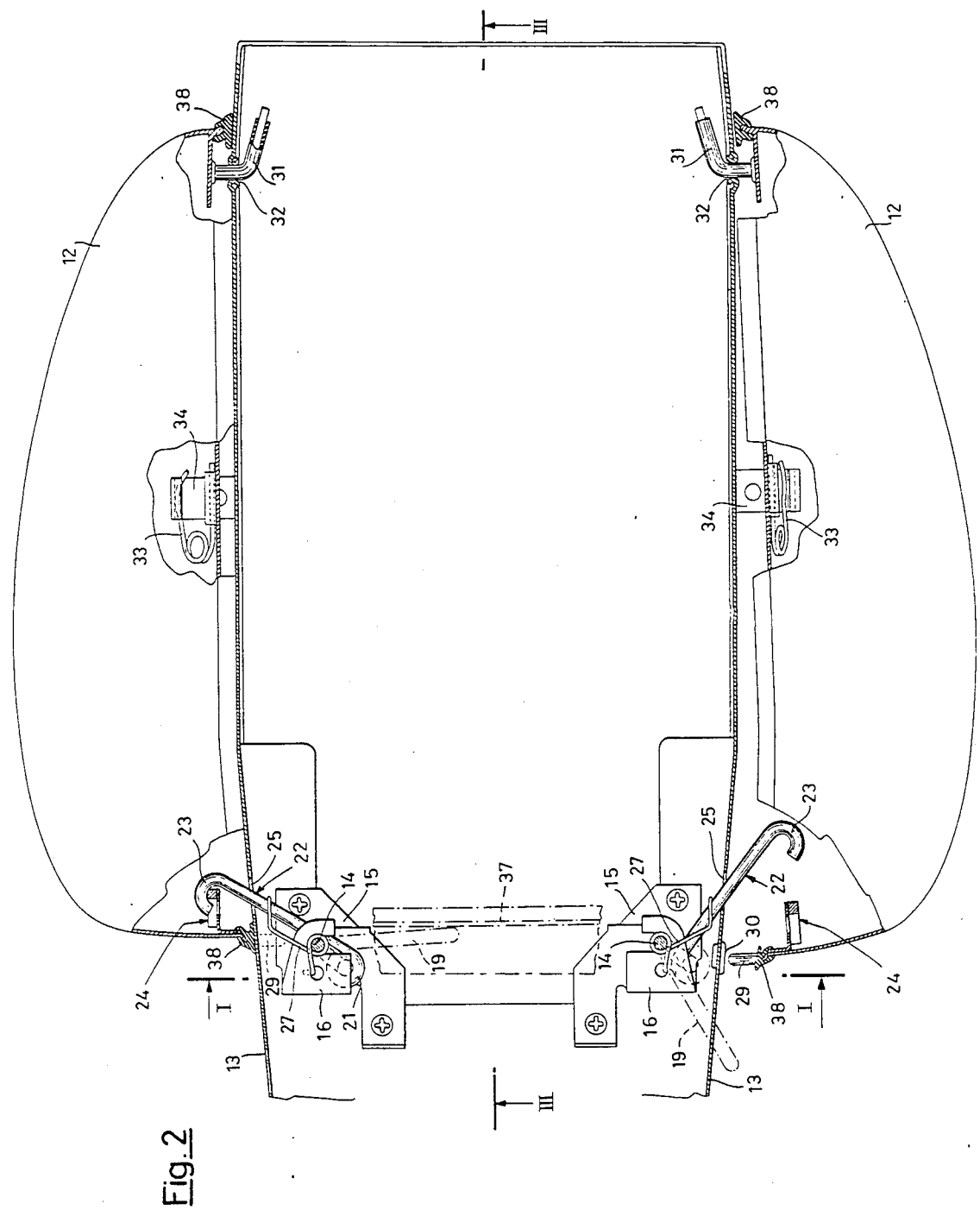
FIG. 2 is a horizontal cross-sectional view of the motor-scooter shown in FIG. 1, taken along the line II—II of FIG. 1.

In FIGS. 1 and 2, the device 10 on the left is shown in the position in which the respective side box 12 is latched, whereas the device 10 on the right is shown in the position in which the side box 12 on the right is clear of the hook.

Figure 4:
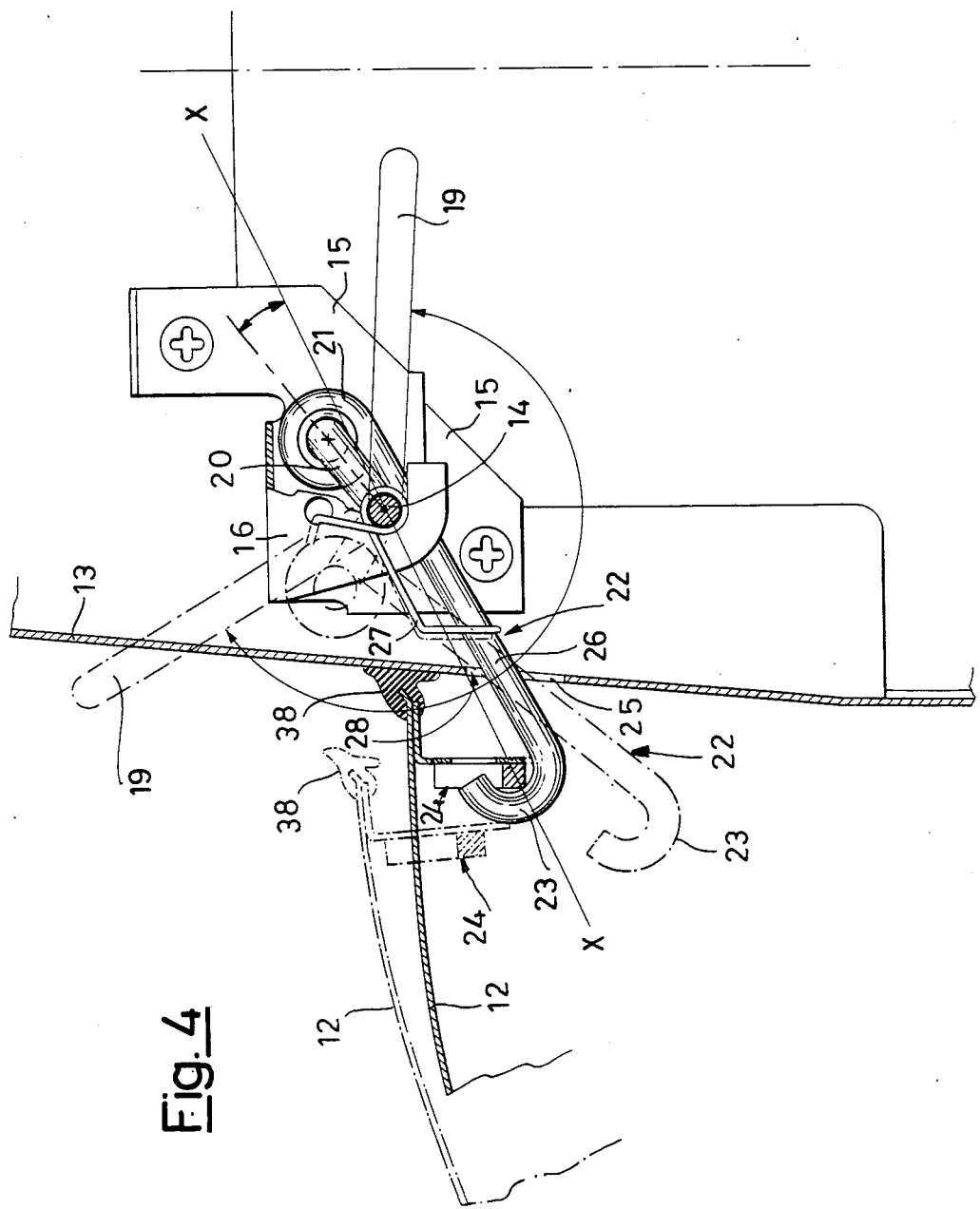
FIG. 4 is a detailed view, in cross-sectional view like that of FIG. 2, of the linkage for one of the two latching devices of FIG. 1.

In operation, for latching a side box 12 to the body 13 by a device such as 10, according to the invention, the procedure, having reference to FIG. 4, is as follows.

Assuming that the device 10 is in its cleared position, that is, with its handle 19 and thus also the hook 22 in the position shown in dash-and-dot lines, the side box 12 is approached to the body 13 and the several matching reference members (for example such as 29 and 30 in FIG. 1) are positioned in the conventional manner for defining the position of the side box 12 relative to the body 13, as will be explained in more detail hereinafter.

Subsequently, the handle 19 is swung counterclockwise until attaining the position shown in thin solid lines. As the handle 19 is being rotated, also the crank 20 is concurrently rotated counterclockwise: at the end of its stroke, it will have overtaken the inner dead center position, which lies on the plane X—X perpendicular to the sheet of FIG. 1.

During such a swinging motion, the hooked portion 23 of the hook assembly 22 can grasp the bracket 24, because it is guided by the shank 26 sliding along the edge 28 of the slot 25, the shank 26 being held adhering to the slot edge by the bias of the spring 27, the result being that the bracket 24 is pulled towards the body 13 and the side box 12 is consequently latched against the body 13.

The hooked portion 23 is kept under tension by the reaction of the bracket 24 due to the springiness of the specially provided gasket 38 which is urged by the side box 12 against the body 13 and, also due to the fact that the assembly composed of the crank 20 and the hook 22 has overtaken its dead center.

To unlatch the side box 12 it is sufficient to rotate the handle 19 clockwise so as to bring it from the position shown in thin solid lines to the position shown in dash-and-dot lines in FIG. 4. The movement by which the hook assembly 22 clears the bracket 24 is likewise originated by the abutment of the shank 26 of the hook assembly 22 against the edge 28 of the slot 25.

The various conventional matching reference members of the body and the side boxes, referred to above, and which are provided on a few motor-scooter models in current use, comprise a front pin 29 fastened to the bottom section of the box 12 and adapted to enter a corresponding opening 30 formed through the body 13, a rear elbow shaped pin 31 fastened to the bottom section of the box 12 and adapted to enter a corresponding opening 32 formed through the body 13, and, lastly, a centrally located spring 33 which is secured at its top to the box 12 and biasses a corresponding tab 34 of the body 13.

As the side box 12 is being secured to the body 13, such matching reference members are matched together and, thereafter, the box 12 is clamped against the body 13 by the hook assembly 22 as outlined above.

Figure 3:
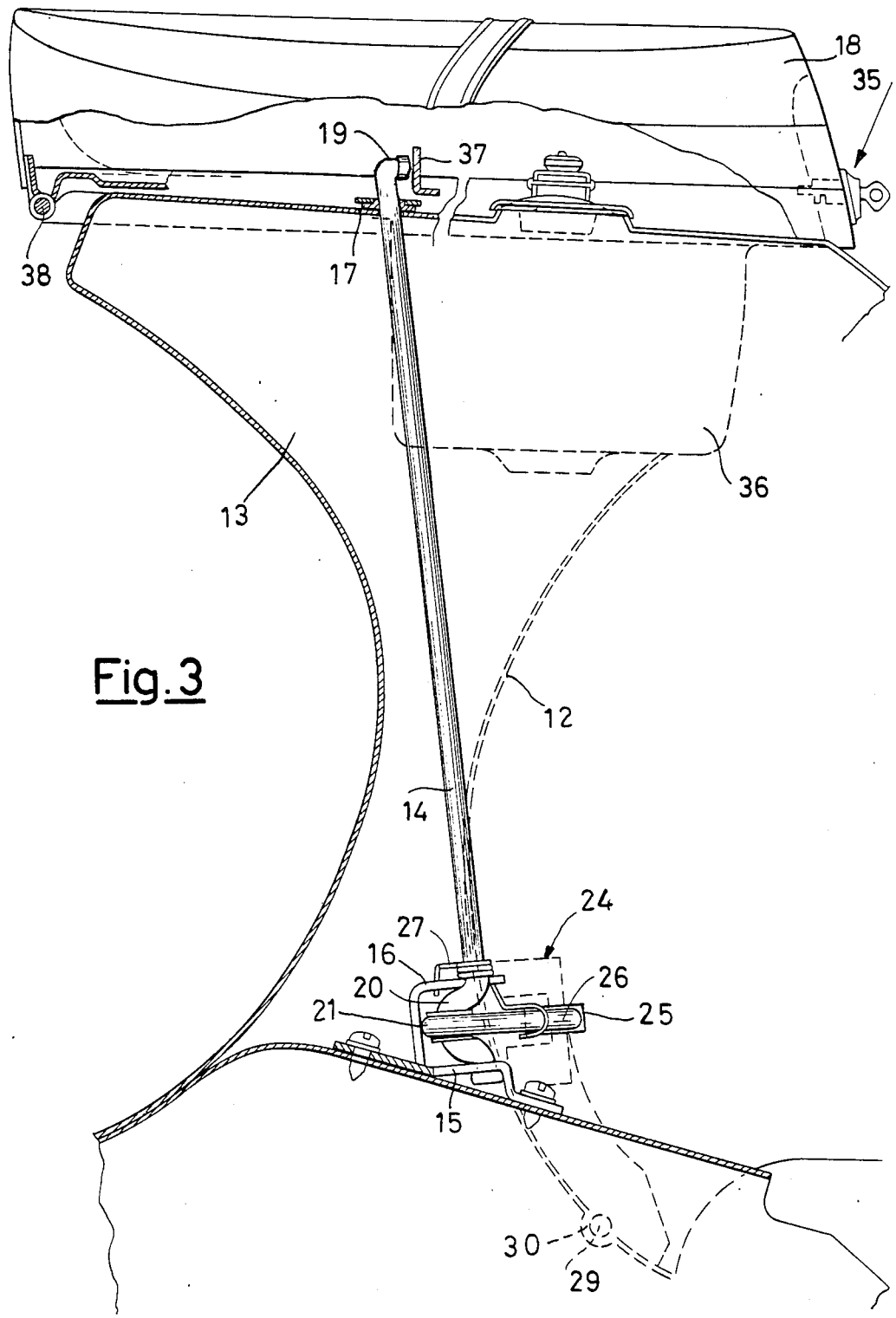
FIG. 3 is a fragmentary cross-sectional view of the motor-scooter shown in FIG. 1, taken along the line III—III of FIG. 2.

It is obvious that the latching and unlatching steps aforementioned are carried out while the saddle is swung open in order to have access to the handle 19. Once the side boxes 12 have been latched in position, the saddle is swung down to take its normal horizontal position of use and is firmly secured to the scooter's body 13 by the lock 35 to prevent unauthorized persons from accessing the underlying fuel tank 36. By so doing, inasmuch as the handles 19 are positioned underneath the saddle 18, unauthorized persons are also prevented from having access to the boxes 12 and from withdrawing them abusively. To prevent, then, possible attempts to have access to the handles 19 even if the saddle 18 has duly been locked, for example by inserting lock-picking tools through the spaces existing between the body 13 and the saddle 18, and "L" shaped channel iron 37 is transversally secured to the saddle 18. The bar 37 acts as a stop abutment for each of the two handles 19 (FIG. 3) so that their rotation with a view to unlatching the boxes 12 abusively is prevented when the saddle 18 is in its horizontal posture of use (solid lines in FIG. 1), whereas such a rotation is permitted when the saddle 18 is swung upwards (dash-and-dot lines of FIG. 1).

The advantages afforded by the exemplary embodiment shown herein are manifold: in the first place, the box-securing means do not require any safety locks of their own, that which would entail an additional cost. Secondly, the device of this invention can conveniently be actuated by a person standing up and without stress whereas, conversely, the hook assemblies as used nowadays can be manipulated only by a kneeling user or, at any rate, by a user placed in an uncomfortable position, the stress being proportional to the pressure existing between the side box gasket and the scooter's body walls. Further, the device has a reliable operability without any wear of component parts and, lastly, the device is composed of a simple linkage consisting of component parts which are extruded or rolled sections easily found on the trade and which must merely be bent, so that the first cost is considerably reduced.

It is understood that the subject invention can find other uses, also beyond the limited field of the motor scooter construction, and take other shapes and embodiments within the scope of the invention which is essentially defined in terms of the latching mechanism which has a transition through a dead center for latchingly securing the removable component part to the fixed structure of the vehicle concerned, the hook for latching or unlatching the removable component part being movable towards and away of a corresponding hook-receiving member, the motion of the mechanism being remotely controllable from a space of the vehicle which can be made inaccessible by a key-actuated locking device.

For example, the hook could be made of sheet metal, the crank could be actuated by a flexible cable or axially tensioned pitmans and the closable space could house a number of similar latching devices for removable component parts to be temporarily secured to the structures of the vehicle concerned.

I claim:

1. A device for releasably securing a removable lateral box to a fixed bodywork of a two-wheeled motor vehicle, characterized in that it comprises a hook having a shank and a hooked extension, said shank extending through a slot in said bodywork from within said bodywork so that said hooked extension resides externally of said bodywork, said slot providing a mounting for oscillation of said hook, said hook being swingable between a position in which the hooked extension seizes an internal projection of the lateral box to clamp the latter against the bodywork and a cleared position by a motion guided by engagement of said hook shank against a surface of said slot, said hook shank being linked by a journal for rotation to a crank-shaped portion of a rod rotatably supported internally in a space of said bodywork which is inaccessible from the outside, one end of said rod being handle-shaped for manual actuation so as to rotate said rod, said handle-shaped end residing in a space of the vehicle, which space can be closed by key-actuated locking means.

2. A latching device according to claim 1, characterized in that said rod is bent to form said crank-shaped portion.

3. A latching device according to claim 2, characterized in that, in its latching position, said hook is kept under tension by resilient means active between said box and said bodywork after said crank-shaped portion has overtaken its dead center position.

4. A device as in claim 1 wherein said vehicle is a motor scooter having a saddle which can be swung upwards and downwards and can be latched in its horizontal position by said key-actuated locking means, said handle-shaped end of said rod projecting from the scooter's body beneath said saddle.

5. A device according to claim 4 wherein said handle-shaped rod end abuts a cross-bar fastened to said saddle integrally, said cross-bar preventing movement of said handle-shaped rod end.

6. In a two-wheeled motor vehicle: a bodywork; a removable cowl-like side box having an inwardly facing opening the periphery of which is clampable to the bodywork; an operator's saddle hinged for swinging movement about a horizontal axis transverse to the bodywork between a raised position and a horizontal position; key-operated locking means for locking the saddle in its horizontal position; and means for releasably securing the side box to the bodywork, said means including a bracket carried on the interior of the side box, a latching member movable between a latching position in which it engages the bracket to thereby clamp the side box to the bodywork and a position clear of the bracket, and a manually operable actuating mechanism for moving the latching member between its positions, said actuating mechanism having a first portion within the bodywork and extending laterally therefrom for cooperation with the latching member, a second portion located within the bodywork and cooperating with said first portion and a third manually operable handle portion cooperating with said second portion and positioned beneath the saddle in a location such as to be accessible when the saddle is in its raised position and inaccessible when the saddle is in its horizontal position.

7. Apparatus as in claim 6 wherein said second portion of said actuating mechanism includes a shaft rotatable by said handle portion and having a crank portion and wherein said actuating member is a hook having a hook end and a shank conected to said crank portion, said shank extending from the bodywork so as position the hook end within the side box.

* * * * *